United States Patent
Arbetter

(10) Patent No.: US 10,020,732 B2
(45) Date of Patent: Jul. 10, 2018

(54) POWER CONVERTER HAVING LOW POWER OPERATING MODE

(71) Applicant: Silanna Asia Pte Ltd, Singapore (SG)

(72) Inventor: Barry S. Arbetter, Raleigh, NC (US)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 15/247,669

(22) Filed: Aug. 25, 2016

(65) Prior Publication Data

US 2018/0062513 A1    Mar. 1, 2018

(51) Int. Cl.
  *H02M 1/00* (2006.01)
  *H02M 3/158* (2006.01)
  *H02M 1/08* (2006.01)

(52) U.S. Cl.
  CPC ............ *H02M 3/158* (2013.01); *H02M 1/08* (2013.01); *H02M 2001/0009* (2013.01); *H02M 2001/0032* (2013.01); *H02M 2001/0054* (2013.01)

(58) Field of Classification Search
  CPC ............ H02M 1/08; H02M 2001/009; H02M 2001/0032; H02M 2001/0045; H02M 2001/0054; H02M 3/158
  USPC ........................................................ 323/271
  See application file for complete search history.

(56) References Cited

U.S. PATENT DOCUMENTS

| | | | |
|---|---|---|---|
| 5,939,871 A | 8/1999 | Tanaka | |
| 6,295,217 B1* | 9/2001 | Yang | H02M 1/4258 363/21.1 |
| 2002/0057082 A1* | 5/2002 | Hwang | H02M 3/158 323/284 |
| 2004/0239300 A1 | 12/2004 | Sutardja et al. | |
| 2006/0158165 A1 | 7/2006 | Inn et al. | |
| 2007/0063682 A1 | 3/2007 | Dagher | |
| 2008/0042709 A1 | 2/2008 | Chen et al. | |
| 2009/0200998 A1 | 8/2009 | Feng et al. | |
| 2010/0148737 A1* | 6/2010 | Li | H02M 3/1588 323/282 |
| 2010/0208500 A1* | 8/2010 | Yan | H02M 3/33523 363/21.12 |
| 2011/0018507 A1* | 1/2011 | McCloy-Stevens | H02M 3/1588 323/271 |
| 2011/0115456 A1* | 5/2011 | Tanifuji | H02M 3/156 323/283 |
| 2013/0100714 A1 | 4/2013 | Zhang et al. | |
| 2013/0214062 A1 | 8/2013 | Seyffert et al. | |
| 2013/0328534 A1* | 12/2013 | Hsieh | G05F 3/02 323/271 |

(Continued)

*Primary Examiner* — Jeffrey Gblende
*Assistant Examiner* — David A. Singh
(74) *Attorney, Agent, or Firm* — The Mueller Law Office, P.C.

(57) ABSTRACT

A power converter includes an input node that receives an input voltage and a control loop that regulates an output voltage of the power converter. The power converter also includes a comparison voltage generation circuit that generates a comparison voltage based on an operating point of the power converter. The power converter also includes a first comparator that compares a control loop voltage in the control loop with the comparison voltage, and generates a control signal. The power converter also includes a mode control circuit that transitions the power converter from the low power operating mode to a first operating mode using the control signal. The output voltage is regulated in both the first operating mode and the low power operating mode.

22 Claims, 11 Drawing Sheets

(56) References Cited

U.S. PATENT DOCUMENTS

| | | | |
|---|---|---|---|
| 2013/0329470 A1* | 12/2013 | Stroppa | H02M 3/3376 |
| | | | 363/21.17 |
| 2014/0084886 A1* | 3/2014 | Causse | H02M 3/158 |
| | | | 323/282 |
| 2014/0369097 A1* | 12/2014 | Prescott | H02M 1/4225 |
| | | | 363/89 |
| 2015/0062108 A1* | 3/2015 | Archibald | H02M 3/156 |
| | | | 345/212 |
| 2015/0137776 A1 | 5/2015 | Thomas et al. | |
| 2015/0194880 A1* | 7/2015 | Wibben | H02M 3/156 |
| | | | 323/282 |
| 2015/0200593 A1* | 7/2015 | Stoichita | H02M 3/158 |
| | | | 323/271 |
| 2015/0229199 A1* | 8/2015 | Lu | H02M 3/33507 |
| | | | 363/21.12 |
| 2016/0276931 A1* | 9/2016 | Trichy | H02M 3/158 |
| 2016/0352228 A1* | 12/2016 | Zhang | H02M 1/32 |

* cited by examiner

200

300

900

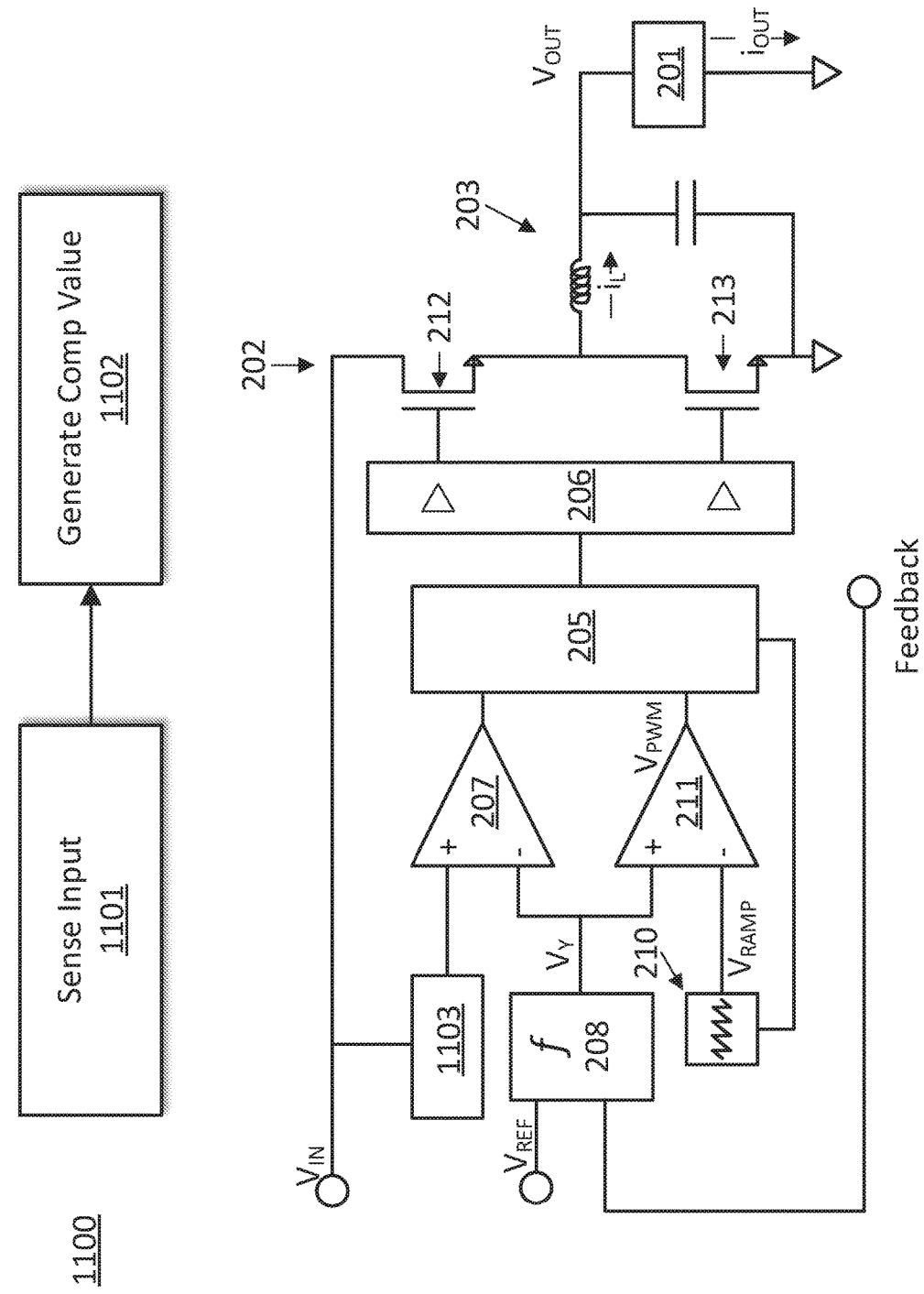

POWER CONVERTER HAVING LOW POWER OPERATING MODE

BACKGROUND OF THE INVENTION

Electronic devices often need to generate multiple power regimes while only being powered by a single source. For example, a laptop computer may only have a single battery but may need to produce power regimes with different supply voltages for the various components on the laptop. Furthermore, regardless of the need for multiple power regimes, electronic devices often need to condition the power that is delivered to them from an external source. Returning to the example of a laptop, the laptop processor contains sensitive electronics and exhibits a widely varying power demand based on how hard the processor is working. Simply plugging in a DC version of the mains voltage source is not an option because the processor will not be shielded from dips or surges in the power supply and the power supply will likewise not be able to keep pace with the rapid transitions in the power drawn by the processor. The aforementioned requirements are addressed by power converters.

FIG. 1 provides a block diagram of an example power converter 100 with the input of the power converter being provided by supply 101 and the output of the power converter being provided to load 102. In this example, the input is a voltage $V_{IN}$ provided on an input node of the power converter and the output is a voltage $V_{OUT}$ provided on an output node of the power converter. Power converter 100 will therefore regulate the output by keeping $V_{OUT}$ at a target voltage despite variation in the current drawn by load 102 or the voltage provided by supply 101. Alternative power converters may regulate an output current while allowing a voltage at the output node of the converter to vary.

Switched mode converters are a specific class of power converters that utilize a switching circuit and an output filter to control the transfer of power from the input regime to the output regime. In the illustrated example, power converter 100 utilizes switching circuit 103 and an output filter that comprises inductor 104 and capacitor 105. The current through inductor 104 is labeled $i_L$ and the current provided to the load is labeled $i_{OUT}$. The switching circuit 103 is itself coupled to the input node, and serves to couple power converter input side 107 to power converter output side 108. One way the power converter can achieve regulation of the output is through the use of a control loop that controls the switching of switch circuit 103. As illustrated, the control loop includes a feedback path 106 that provides a control signal to switching circuit 103 that is based on a measurement taken from output side 108.

Power converters can operate in different modes based on various factors such as the operating point of the converter. For example, if load 102 dramatically decreased the amount of power it required from supply 101, power converter 100 could be switched into a low power operating mode to preserve efficiency while still regulating the output. While benefits are provided by switching to different modes based on the operating point of the converter, transitioning between modes can disrupt the regulation of the power converter. These disruptions can cause the regulated output to deviate from its desired value by an unacceptable degree. Some of these disruptions are referred to as output overshoot, output undershoot, and unacceptably high ripple current in the power converter.

SUMMARY OF INVENTION

In one approach a method to control a power converter is disclosed. The method comprises transitioning the power converter from a first operating mode to a low power operating mode. A periodic signal generator used in a control loop of the power converter is disabled in the low power operating mode. The method also comprises generating a comparison voltage based on an operating point of the power converter. The method also comprises comparing a control loop voltage in the control loop with the comparison voltage using a first comparator. The method also comprises generating a control signal with the first comparator. The method also comprises transitioning the power converter from the low power operating mode back to the first operating mode using the control signal. The periodic signal generator is enabled in the first operating mode. The method also comprises regulating an output of the power converter in the low power operating mode and the first operating mode.

In another approach a power converter is disclosed. The power converter comprises a control loop that regulates an output of the power converter. The power converter also comprises a periodic signal generator used in the control loop, wherein the periodic signal generator is enabled in a first operating mode of the power converter and is disabled in a low power operating mode of the power converter. The power converter also comprises a comparison voltage generation circuit that generates a comparison voltage based on an operating point of the power converter. The power converter also comprises a first comparator that: (i) compares a control loop voltage in the control loop with the comparison voltage; and (ii) generates a control signal. The power converter also comprises a mode control circuit that transitions the power converter from the low power operating mode to the first operating mode using the control signal. The output is regulated in both the first operating mode and the low power operating mode.

In another approach a power converter is disclosed. The power converter comprises an input node that receives an input voltage of the power converter. The power converter also comprises a control loop that regulates an output voltage of the power converter. The power converter also comprises a power transistor that is coupled to the input node and is used by the control loop to regulate the output voltage of the power converter. The power converter also comprises a comparison voltage generation circuit that generates a comparison voltage based on an operating point of the power converter. The power converter also comprises a first comparator that: compares a control loop voltage in the control loop with the comparison voltage, and generates a control signal. The power converter also comprises a mode control circuit that transitions the power converter from the low power operating mode to a first operating mode using the control signal. The output voltage is regulated in both the first operating mode and the low power operating mode. The power transistor couples an output side of the power converter to an input side of the power.

BRIEF DESCRIPTION OF THE DRAWINGS

FIG. 11 illustrates a block diagram of a power converter topology and a flow chart for the operation of a comparison voltage generator thereof in accordance with embodiments of the present invention.

DETAILED DESCRIPTION OF THE EMBODIMENTS

Figure 1:
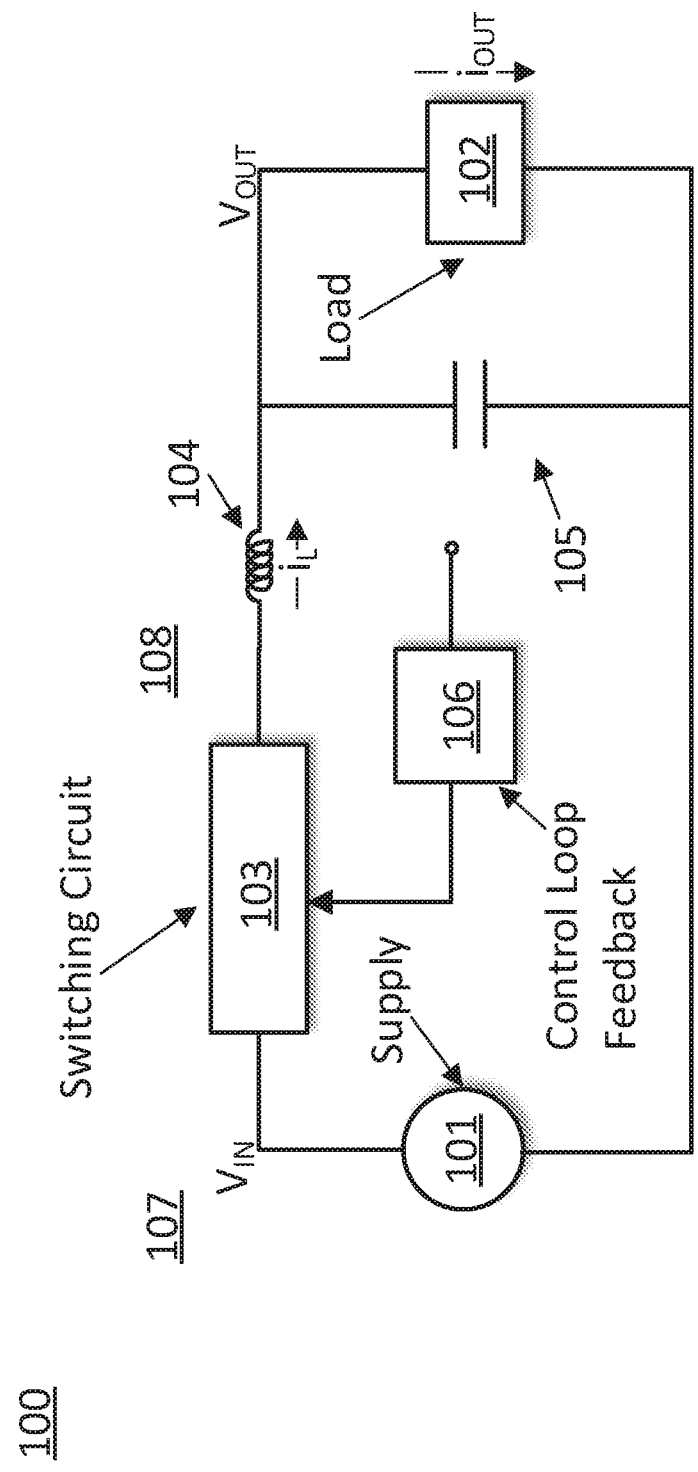
FIG. 1 illustrates a block diagram of a power converter topology.

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

Power converters can be designed to operate in different modes depending upon the operating point of the converter. The operating point of the power converter can be defined by exogenous factors such as the temperature of the power converter, the instantaneous and inherent characteristics of the power supply, and the instantaneous and inherent characteristics of the load. The operating point can also be defined by the internal state of the power converter circuitry. In order to switch the power converter between the modes in which it can be operated, some kind of control system must be aware of the operating point, and transition the power converter into the appropriate mode. In addition, the control system must enact this change while causing the least amount of disruption to the regulation of the output. Systems and methods for efficiently transitioning the mode of a power converter are disclosed below. In particular, systems and methods for the efficient transition of a power converter between a first operating mode and a low power operating mode are disclosed. However, the teachings herein are more widely applicable to the transition of a power converter between any two disparate operating modes based on the operating point of the converter.

A power converter can be used to regulate an output of the power converter in both a first operating mode and a second operating mode. The second operating mode could be a low power operating mode. The power converter could be capable of operating in multiple modes other than the first and second operating modes. Each operating mode can involve receiving an input to the power converter on an input node of the power converter and regulating an output of the power converter using a distinct approach that differs from the approach utilized by the other operating modes. For example, the output of the power converter can be regulated through the use of a control loop that regulates the output of the power converter, and the characteristics of the control circuitry in that control loop could change from one mode to another. Specifically, if the operating point of the converter is such that the load is not pulling as much power, it may be possible to disable certain aspects of the control circuitry to save power by operating in a low power operating mode. As another example, the power converter could operate in a switched mode in one operating mode and a linear mode in another operating mode.

A power converter can include a mode control circuit that transitions the power converter between the aforementioned operating modes. The mode control circuit can respond to a control signal that indicates when a transition has occurred in the operating point of the power converter. The control signal can be generated by a comparator that compares a measurement of the operating point of the power converter with a comparison value. The comparison value could be set by design or could itself vary with the operating point of the power converter. For example, the measurement of the operating point of the power converter could be a measurement of any voltage in the power converter such as the voltage on the output node, the voltage on the input node, or a voltage in the control loop. As another example, the comparison value can vary with the operating point of the power converter by varying with the output voltage set point of the converter. In other words, if the power converter has multiple output voltage set points, the information that selects the output voltage can be used to vary the comparison value. However, the measurement could alternatively be a measurement of a current or any other measurement regarding the operating point of the power converter. The comparison value could be a set voltage that serves as the crossing point between two different operating modes (i.e., when the measurement is above the crossing point the mode control circuit places the power converter in a first mode, but when the measurement is below the crossing point the mode control circuit places the power converter in a second mode).

Figure 2:
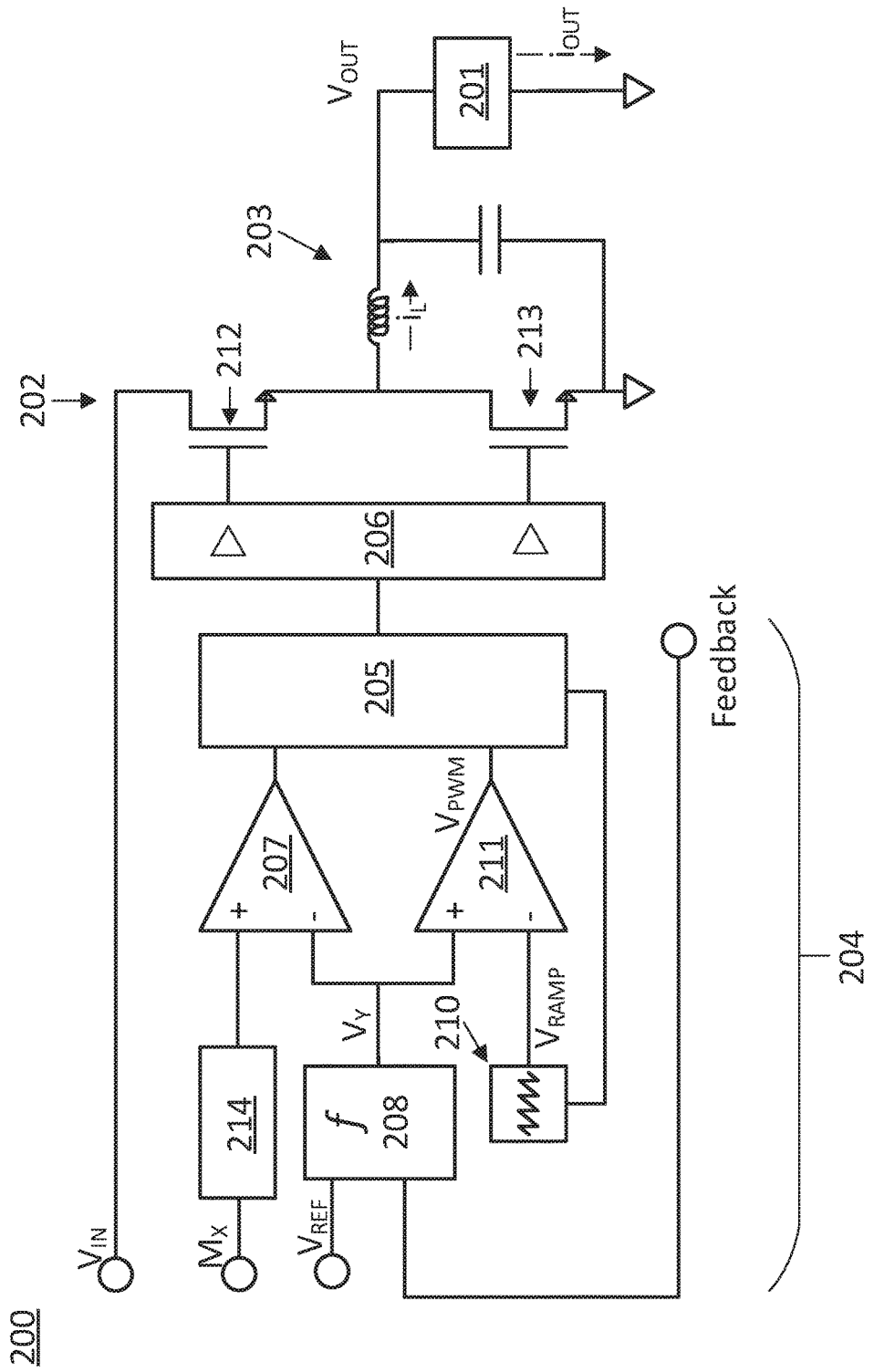
FIG. 2 illustrates a block diagram of a power converter topology in accordance with embodiments of the present invention

FIG. 2 illustrates an example power converter 200 that regulates an output voltage $V_{OUT}$ on an output node of power converter 200 for a load 201 using a control loop. Power converter 200 regulates $V_{OUT}$ in both a first operating mode and a low power operating mode. As such, the voltage $V_{OUT}$ is a regulated voltage in both operating modes. Power converter 200 receives voltage $V_{IN}$ on its input node. The voltage $V_{IN}$ can be the voltage of a battery or other power supply that is being converted by power converter 200. The voltage $V_{OUT}$ can be a voltage applied to a processor, ASIC, or other load.

Power converter 200 is a switched mode power converter that utilizes switching circuit 202 and output filter 203 to transfer power in a controlled manner from the input node to the output node. A switching circuit can include power transistors such as FETs or BJTs that are designed to withstand much higher currents and voltages than standard transistors. The power transistors can couple an output side of the power converter to an input side of the power converter. The power transistors can include control nodes, such as FET gates, that respond to control signals provided by the control circuitry of the comparator. In the case of switching regulators, the control nodes will typically ultimately be driven by the control loop of the power converter.

The control loop of power converter 200 includes switching circuit 202, output filter 203, the output node $V_{OUT}$, control circuitry 204, and driver circuit 206. Voltages in control circuitry 204 can be referred to as control loop voltages. Mode control circuit 205 alters the characteristics of control circuitry 204, and thereby the characteristics of the overall control loop, when the power converter transitions between the first operating mode and the low power operating mode.

As stated previously, the operating modes of a power converter can vary in terms of its power consumption. In certain modes of operation the control circuitry of the power converter can alter its characteristics to make the overall power converter more energy efficient while still providing sufficient regulation of the power converter's load. For example, power converters will often utilize a periodic signal generator used in the control loop of the power converter in certain modes of operation. However, the periodic signal generator may not always be used across all modes of operation the power converter is designed for, or may be used less frequently in one mode of operation as compared to another. As another example, the control circuitry could include circuitry to protect against regulation errors that are more problematic at one operating point of the power converter than the other, which therefore do not need to remain active in each operating mode of the power converter. In these situations, the additional control circuitry can be disabled in one operating mode and enabled in another under the control of the mode control circuit. In a specific example, a periodic signal generator used in the control loop of a power converter could be enabled in a first operating mode and disabled in a low power operating mode.

Power converter 200 provides an example of a power converter that operates in a first and a second operating mode where the control circuitry alters its characteristics according to the mode in which the power converter is currently operating. The second operating mode of power converter 200 is low power relative to the first operating mode and can be referred to as a low power operating mode. The control signal utilized by mode control circuit 205 is provided by a first comparator 207. A description of the specific operating points at which the power converter could be operating in order to utilize such operating modes is provided below with respect to power converter 200 and FIGS. 4-5. A description of the manner in which the power converter senses its operating point and selects an operating mode is provided below with reference to FIGS. 6 and 8-10.

In the first operating mode of power converter 200, a feedback signal, marked Feedback in FIG. 2, is obtained from the output side of the power converter and is delivered to the control circuitry 204. The feedback signal could be a combination of signals that are each based on different operating point parameters of power converter 200. For example, the feedback signal could be based on a measurement of the output voltage $V_{OUT}$, an average of values for $V_{OUT}$ over a given time period, a measurement of the current through inductor 203 $i_L$, a measurement of the currents through the power transistors, a measurement of the current through the capacitor, and any combination of those values. The feedback signal is provided to feedback circuit block 208. In certain approaches, feedback circuit block 208 will also receive a reference voltage $V_{REF}$ or other reference signal, to guide the operation of the control loop. The reference voltage is set externally to the power converter and can be used in combination with other design parameters to set the level of $V_{OUT}$ with respect to $V_{IN}$. Feedback circuit block 208 continues the control loop by producing a compensator signal $V_Y$ based on the feedback signal and the optional reference signal.

Control circuitry 204 also includes a periodic signal generator 210. In power converter 200, the periodic signal is a periodic ramp signal. While in the first operating mode, power converter 200 also uses a second comparator 211 that compares $V_Y$ with the periodic signal generated by the periodic signal generator 210. The second comparator 211 generates a pulse width modulated $V_{PWM}$ signal based on this comparison. As such, second comparator 211 can be referred to as a pulse width modulator comparator. In the first operating mode, mode control circuit 205 passes $V_{PWM}$ to driver circuit 206. Driver circuit 206 then switches the switching circuit 202 using $V_{PWM}$. In situations where switch circuit 202 comprises power transistors, driver circuit 206 will switch the power transistors using $V_{PWM}$.

Figure 3:
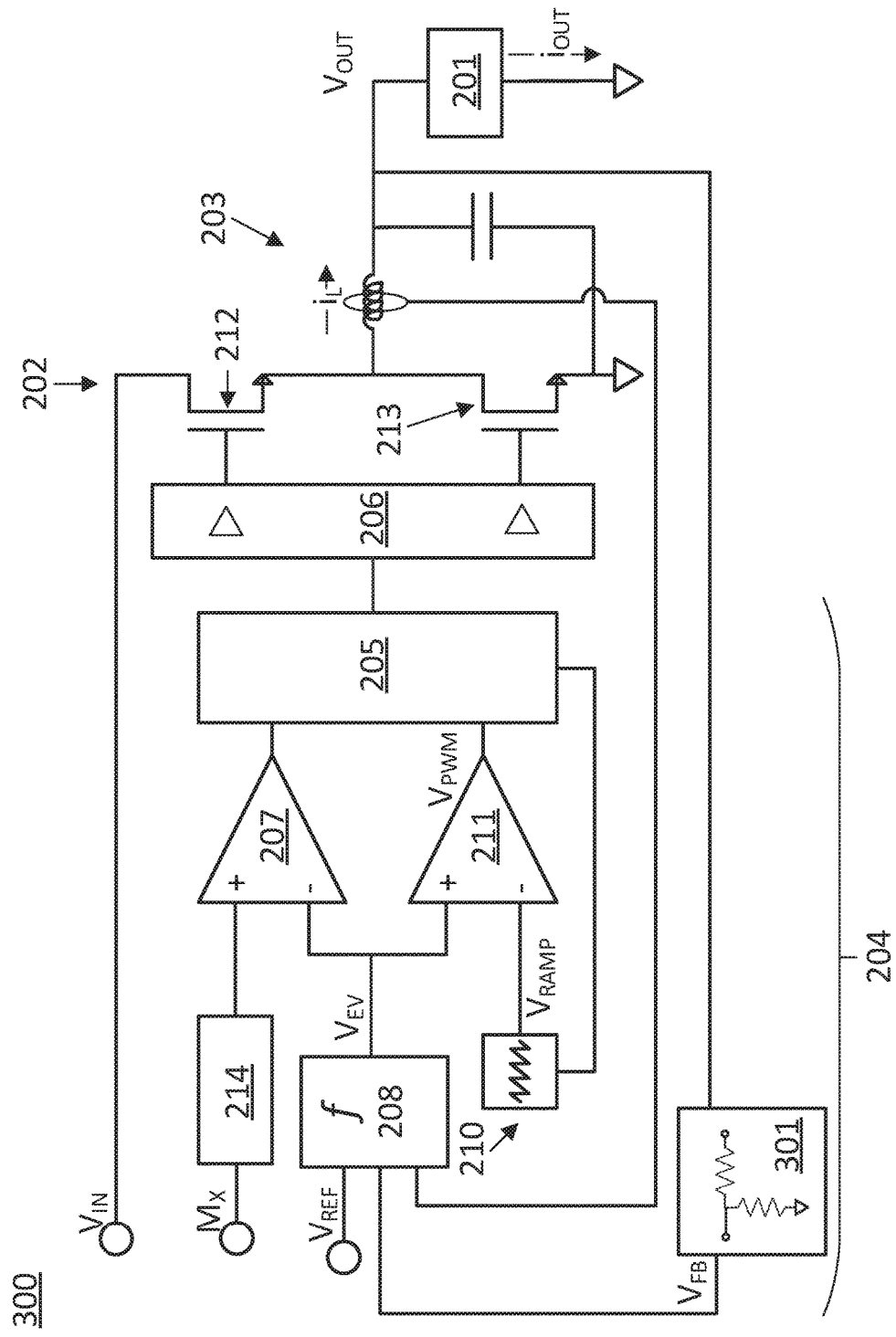
FIG. 3 illustrates a block diagram of a power converter topology with current mode feedback in accordance with embodiments of the present invention.

FIG. 3 illustrates power converter 300 with a specific implementation of control circuitry 204. Power converter 300 operates under a current mode control loop in which the feedback signal is a combination of the current through the inductor $i_L$ and the output voltage $V_{OUT}$. In this approach, a feedback voltage $V_{FB}$ is created by a voltage divider 301 based on $V_{OUT}$. Feedback circuit block 208 can include an amplifier that compares the feedback voltage with a reference voltage $V_{REF}$ and generates a control loop voltage. The amplifier can be a transconductance amplifier. In power converter 300, and in approaches in accordance thereof, the particular control loop voltage produced by feedback circuit block 208 can be referred to as an error voltage of the power converter $V_{EV}$.

One example of a low power operating mode of power converter 200, is utilized when load 201 is drawing relatively minimal power and the inductor current in output filter 203 could potentially go negative and cause a loss of power to ground. If the switching circuit of the power converter utilized two power transistors, as shown, power transistor 212 could be referred to as the control transistor and power transistor 213 could be referred to as the synchronous rectifier transistor. Power transistor 212, the control transistor, is coupled to the input node and is used by the control loop to regulate the output voltage of the power converter in combination with power transistor 213. Power transistor 212 couples the output side of power converter 200 to the input side of power converter 200.

The synchronous rectifier transistor 213 can be operated to function as a diode to prevent the inductor current from going negative by turning the synchronous rectifier transistor 213 off when the current through the transistor is near zero amps, using a circuit to detect when the current is near zero amps. This is often done to save power since a negative current removes charge from capacitor 105 which gets replenished on the next switching cycle and this process of removing and adding charge results in preventable power losses in the power converter. In this situation, where the inductor 104 has zero amps of current for a finite amount of time during the switching cycle, the operating mode of the power converter can be referred to as a discontinuous conduction mode (DCM). In DCM, the current through the inductor 104 and the derivative thereof are zero at a certain point during a switching period of switching circuit 202.

Otherwise the operating mode of power converter 200 is referred to as a continuous conduction mode (CCM).

In DCM, the periodic signal generator can be disabled for at least a portion of the switching period because there are appreciable stretches during each switching period of switching circuit 202 in which the capacitor in output filter 203 can provide all of the charge needed by load 201. As such, power can be saved in switching circuit 202, driver circuit 206, output filter 203, and control circuitry 204 to boost the efficiency of power converter 200 when the load 201 is not drawing a large amount of current. For example, an oscillator used to generate the periodic signal may continuously draw current while it is activated and the oscillator could be shut off during each switching cycle. Mode control circuit 205 can therefore disable periodic signal generator 210 while the power converter is in DCM, putting the power converter 200 into a variable switching frequency mode. The variable switching frequency mode can be considered a low power mode because of the resulting decrease in current consumption in control circuitry 204. The variable switching frequency mode also reduces power loss in the driver and switching circuits because there are fewer switching events per second and each switching event can cause power loss. The mode control circuit 205 can also, in combination or in the alternative, blank the $V_{PWM}$ signal while the power converter is in the variable switching frequency mode.

The transition between DCM and CCM modes of operation can be conceptualized as a transition in the operating point of the power converter for purposes of triggering the control circuit to switch between a first mode of operation and a low power mode of operation. For example, a power converter can be designed to switch into a variable switching frequency mode when the power converter is in DCM mode and a fixed switching frequency mode when the power converter is in CCM mode. These two states could be referred to as a DCM variable switching frequency mode and a CCM fixed switching frequency mode. In addition, power converters can exhibit all four combinations of DCM/CCM and first/low power operating modes. For example, the power converter may be configured to switch to a variable switching frequency mode just prior to when the power converter actually transitions into DCM. In such a situation, the power converter could operate in a CCM variable switching frequency mode between two states in which the power converter is first operating in a CCM fixed switching frequency mode and ends up in a DCM variable switching frequency mode. Other variations are possible such as switching out of the low power mode just prior to a transition back to operating in a CCM mode.

Figure 4:
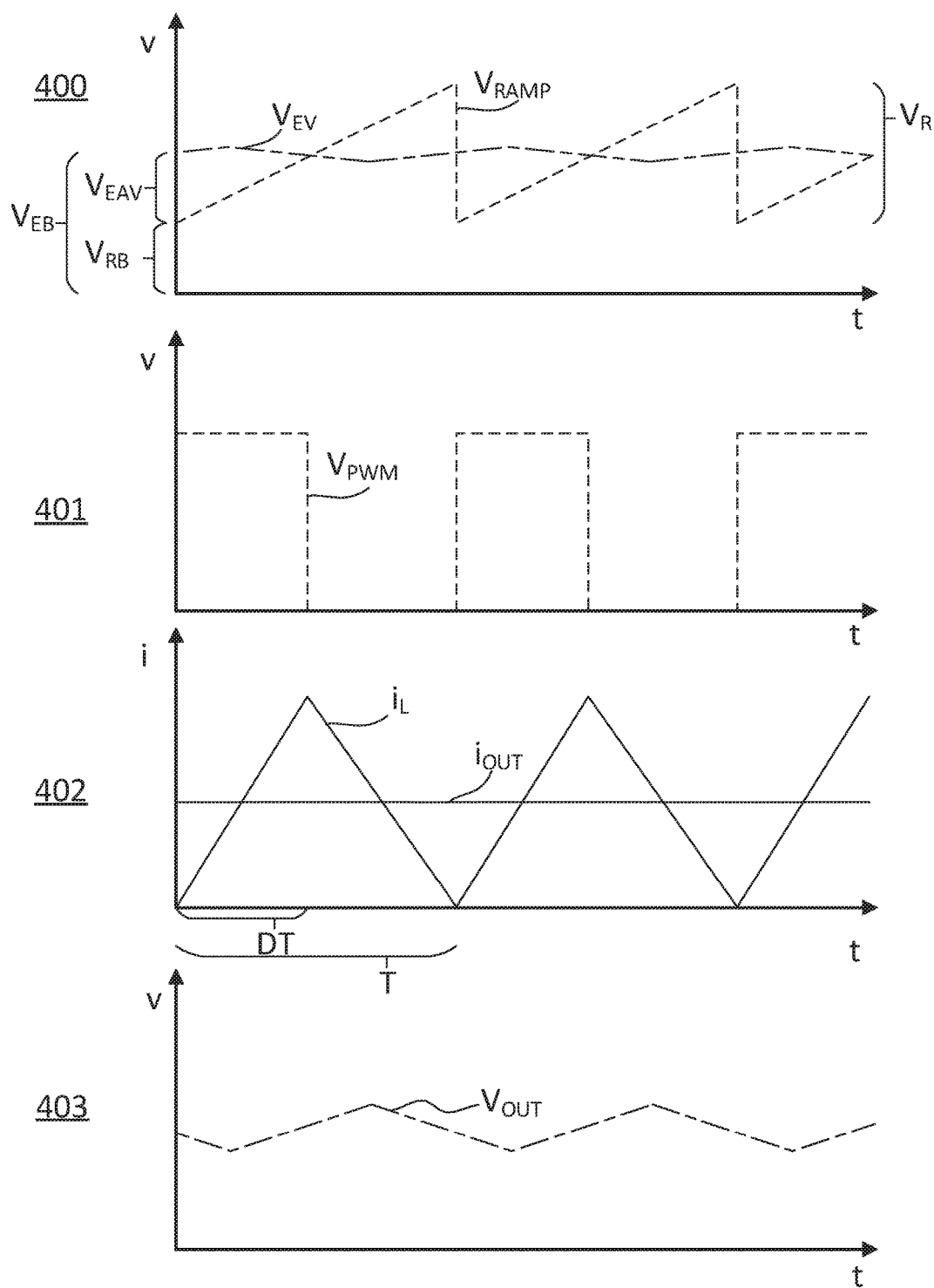
FIG. 4 illustrates a set of four axes, having aligned x-axes in units of time, which describe the operation of the power converter of FIG. 2 in continuous conduction fixed switching frequency mode.
Figure 5:
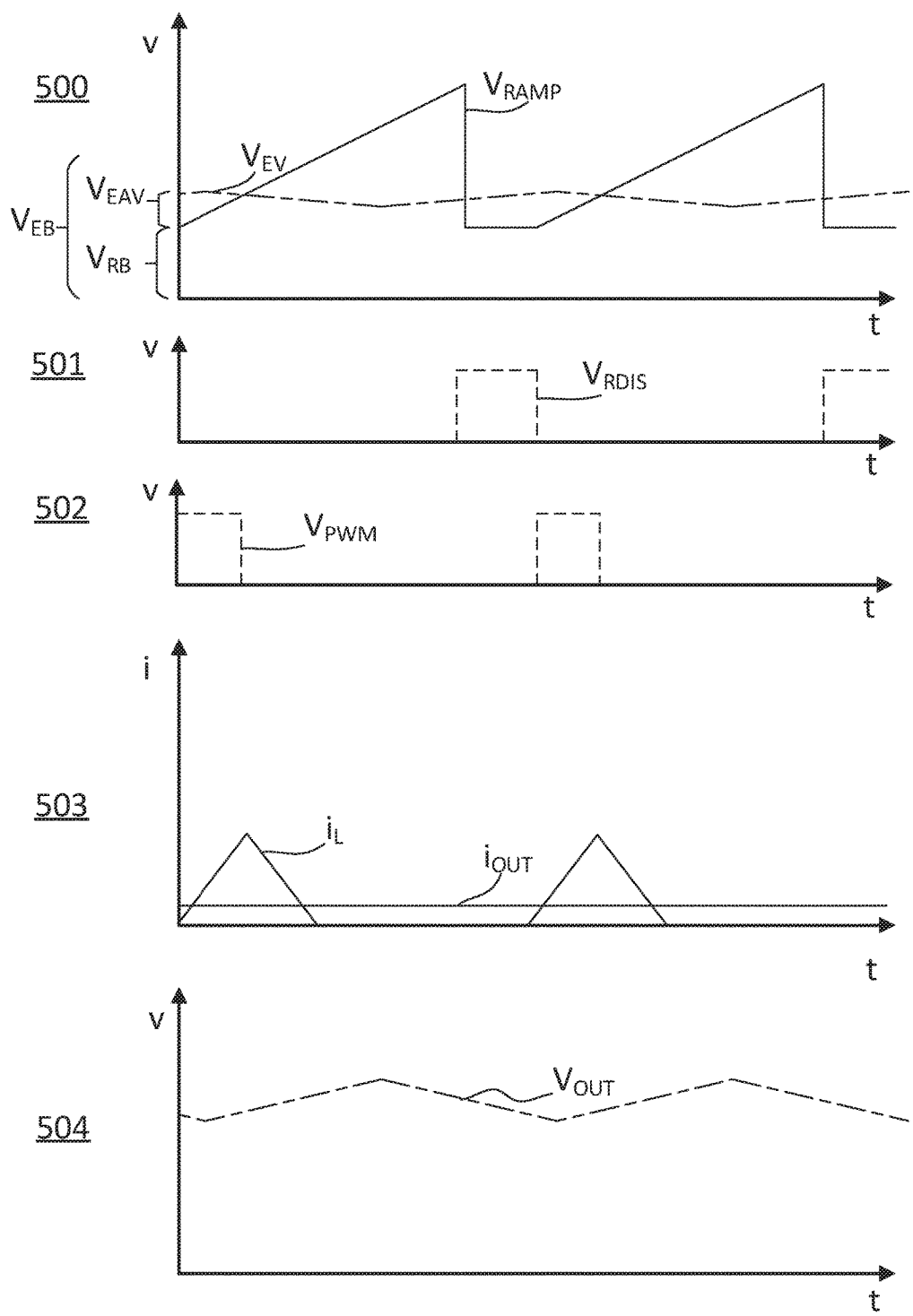
FIG. 5 illustrates a set of five axes, having aligned x-axes in units of time, which describe the operation of the power converter of FIG. 2 in discontinuous conduction variable switching frequency mode.

The operation of a power converter such as power converter 200 operating in a CCM fixed switching frequency mode can be described with reference to FIG. 4 and a DCM variable switching frequency mode can be described with reference to FIG. 5. FIG. 4 includes four sets of axes 400, 401, 402, and 403. The abscissa of each of these sets of axes is aligned with the others and is in units of time. The ordinate of the sets of axes 400, 401, and 403 is in units of volts. The ordinate of set of axes 402 is in units of amps. FIG. 5 includes five sets of axes 500, 501, 502, 503, and 504. The abscissa of each of these sets of axes is aligned with the others and is in units of time. The ordinate of the sets of axes 500, 501, 502, and 504 is in units of volts. The ordinate of set of axes 503 is in units of amps.

FIG. 4 can be used to describe the operation of power converter 200 operating in CCM fixed switching frequency mode. Axes 400 illustrates $V_{RAMP}$ and $V_{EV}$, the periodic signal and the error voltage respectively. Axes 401 illustrates $V_{PWM}$, the output of the PWM comparator. When $V_{EV}$ is less than $V_{RAMP}$, $V_{PWM}$ goes to its low value. When $V_{EV}$ is greater than $V_{RAMP}$, $V_{PWM}$ goes to its high value. The ramp voltage starts at a voltage $V_{RB}$ and increases by a voltage $V_R$ across a period of the periodic signal T. The error voltage begins each switching period with a voltage $V_{EB}$ which is equal to the starting ramp voltage $V_{RB}$ plus another voltage $V_{EAV}$. The duration of each period in which the $V_{PWM}$ signal is high is DT. Axes 402 illustrates the output current $i_{out}$ which is the current delivered to load 201, along with the inductor current $i_L$ which is the current through the inductor of output filter 203. The load is drawing a constant current throughout the period of time illustrated. Axes 403 illustrates the output voltage $V_{OUT}$ which is regulated but has a minor ripple owing to the switching of the power converter.

FIG. 5 can be used to describe the operation of power converter 200 operating in DCM variable switching frequency mode. As before, axes 500 illustrates $V_{RAMP}$ and $V_{EV}$, axes 502 illustrates $V_{PRM}$, axes 504 illustrates $V_{OUT}$, and axes 503 illustrates $i_L$ and $i_{OUT}$. Like values are similarly labeled between FIG. 4 and FIG. 5. As with the example from FIG. 4, the load is drawing a constant current throughout the period of time illustrated. However, the current drawn by the load is considerably less on axes 503 as compared to axes 402. As a result, $V_{PWM}$ has a much smaller duty cycle in axes 502 as compared to axes 401, and there are two extended periods on axes 503 in which the $i_L$ drops to zero. In addition, there is an additional signal called the ramp disable signal which is illustrated on axes 501 as $V_{RDIS}$. This signal temporarily disables the periodic signal generator each switching cycle, thereby saving power. In the example of FIG. 2, this signal could be generated by mode control circuit 205.

The ability for a power converter to switch into a low power mode, such as the DCM variable switching frequency mode described above with respect to power converter 200, increases the efficiency of the power converter. In a similar fashion, a mode control circuit could generally shut off any portion of a power converter's control circuitry that was temporarily not needed to save power in a low power mode. However, if faced with a rapid change in the load, a power converter that switched into a low power mode might not be able to respond fast enough to keep the load regulated within a desired specification. The ability to rapidly transition out of a low power mode is therefore a desirable trait for a power converter.

A rapid transition between operating modes of a power converter, with minimal disturbance on the regulated output, can be achieved by monitoring a signal in the control loop of the power converter, and triggering a return to an original operating mode when the monitored signal returns to a value that it would have had if the power converter had never left the original operating mode. The monitoring can be conducted by generating a comparison signal, sensing a signal in the control loop, comparing the two values, and generating a control signal based on the comparison. As a specific example, the error voltage of a power converter could be compared to a comparison voltage while the power converter was in a low power operating mode, and the comparison could be used to determine when the power converter should be switched back into the first operating mode. The comparison voltage could be equal to what the error voltage would have been if the device had never left the first operating mode and was faced with the present operating point of the power converter. Upon detecting this event, the converter could then switch back into the first operating mode.

With reference to the specific example of power converter 200, in which the power converter is transitioning between a first operating mode and a low power operating mode, the comparison could be conducted by comparator 207, the sensed signal could be the compensator signal, and the comparison voltage could be generated by comparison voltage generation circuit 214 based on an operating point of the power converter determined by design set point and/or measurement $M_X$. The measurement could be a temperature, voltage, current, or any other measurement and/or design setting indicative of the operating point of the converter. The comparison voltage could have a first value when the power converter is in the low power operating mode and could be an estimate of what the compensator signal would be if the power converter were still in the first operating mode. With reference to power converter 300 in FIG. 3, the compensator signal could be replaced with the error voltage in that analysis.

Figure 6:
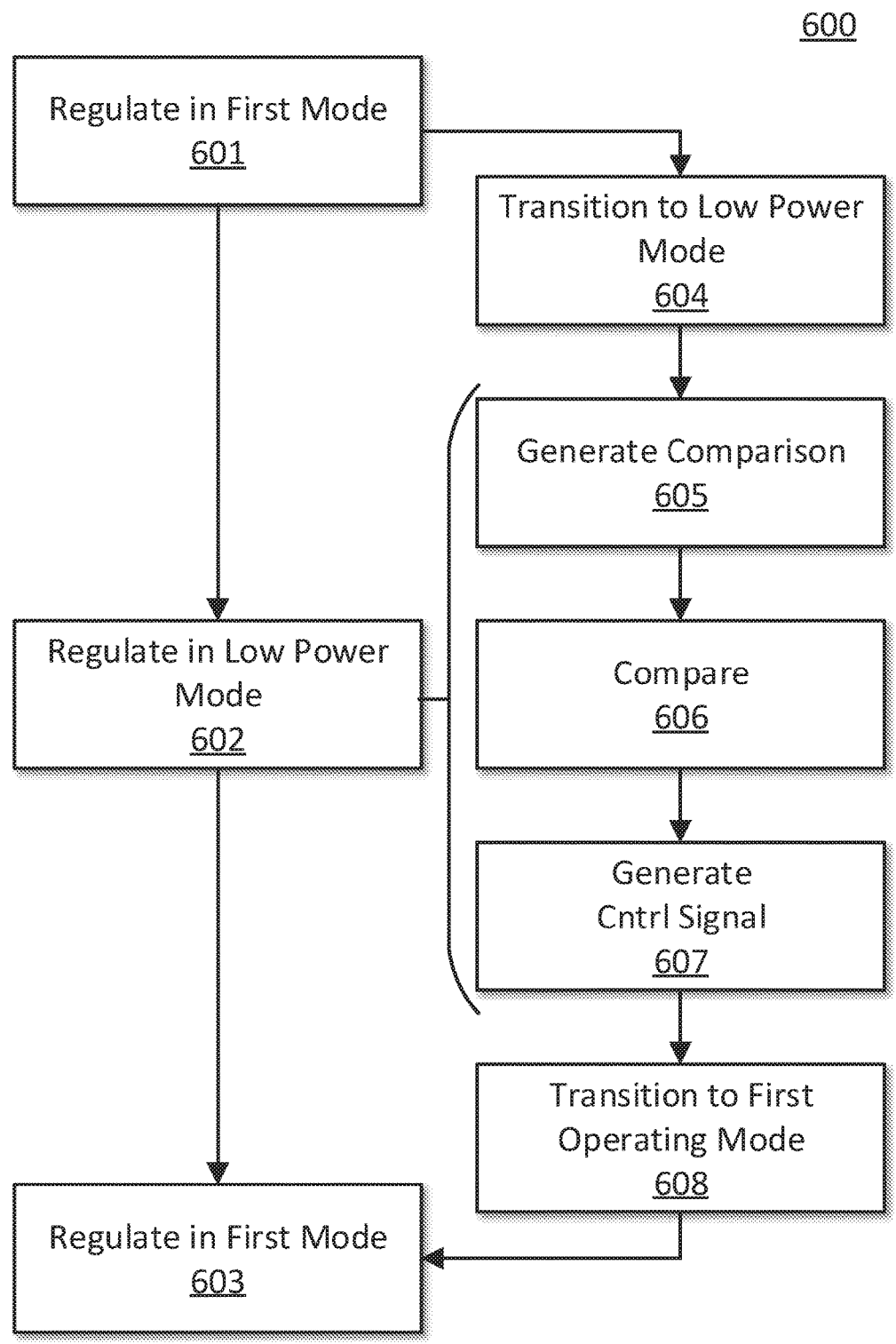
FIG. 6 illustrates a flow chart of a set of methods for controlling a power converter in accordance with embodiments of the present invention.

FIG. 6 illustrates a flow chart of a set of methods 600 for controlling a power converter. The set of methods include step 601 in which an output of the power converter is regulated in a first operating mode. The flow chart includes two branches that where the left branch is associated with the action of the power converter overall, and the right branch is associated with control circuitry more specifically. The left branch is meant to indicate that the load of the power converter is continuously regulated as the right branch is executed. The right branch illustrates the action of the control circuitry as the power converter transitions from one operating mode to the other and back again. As such, the left branch includes step 602 of regulating the output of the power converter in a low power operating mode and a step 603 of regulating the output of the power converter in the first operating mode to show the effect of the transitions executed by the right branch.

Figure 7:
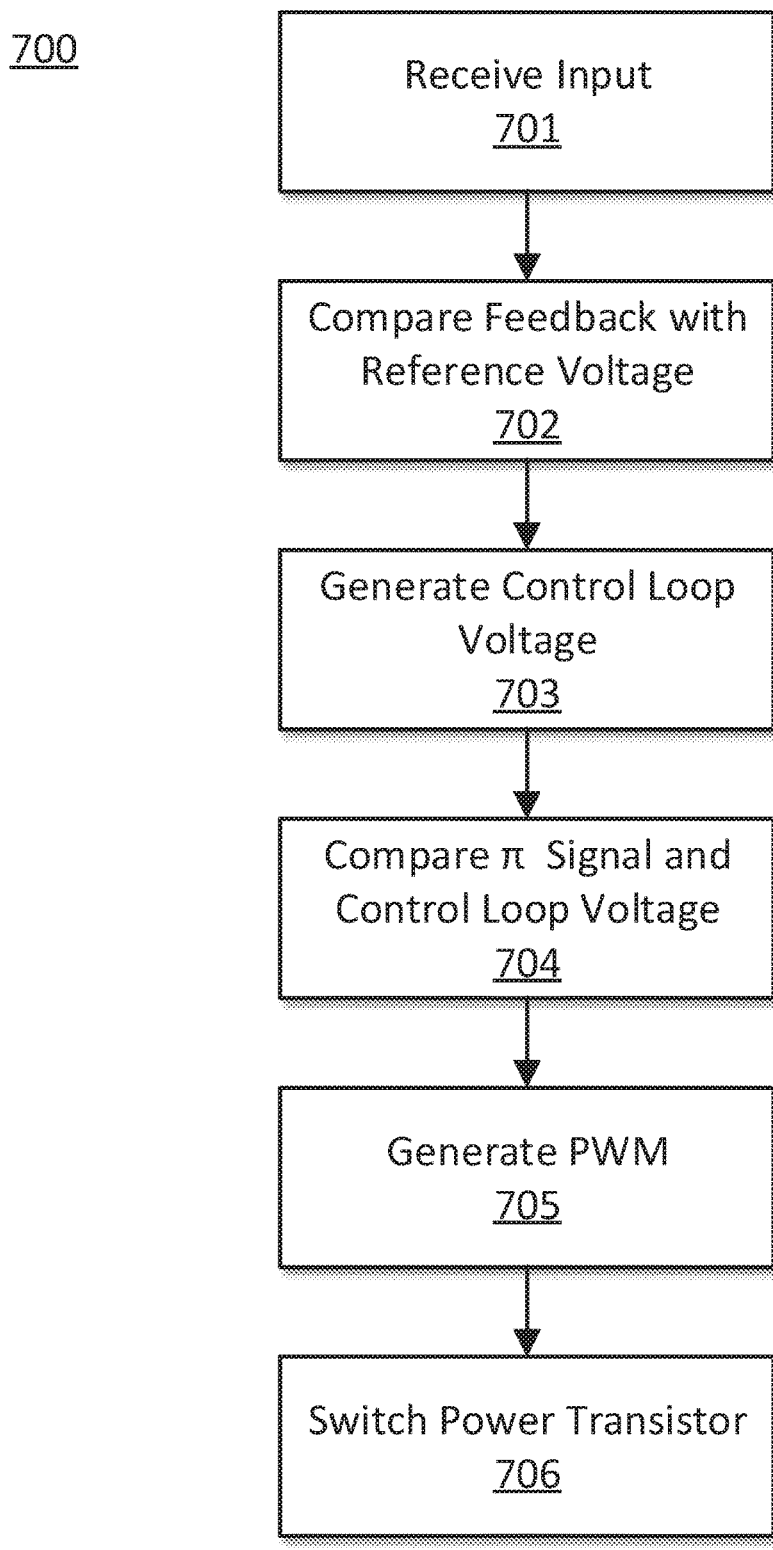
FIG. 7 illustrates a flow chart of a set of methods for regulating an output of a power converter in accordance with embodiments of the present invention.

The steps of regulating the output of the power converter could include multiple sub-steps. One approach for executing step 601 can be described with reference to power converter 200 and FIG. 7. FIG. 7 includes flow chart 700 which begins with step 701 of receiving an input on an input node of a power converter. With reference to power converter 200 this step could include receiving power from a power supply coupled to the input node.

Flow chart 700 also includes steps 702 and 703 of comparing a feedback voltage with a reference voltage using an amplifier and generating a control loop voltage with the amplifier. The feedback voltage could be generated by feedback circuit block 208 in power converter 200. With reference to power converter 300, these steps could include a transconductance amplifier in block 208 comparing $V_{FB}$ with $V_{REF}$ and generating $V_{EV}$. In this situation, $V_{EV}$ would have a magnitude proportional to the difference between $V_{REF}$ and $V_{FB}$. As illustrated by power converter 300, the control loop could regulate $V_{OUT}$ by controlling power transistor 212 in accordance with the feedback voltage $V_{FB}$ which is based on the output of the power converter (specifically the voltage on the output $V_{OUT}$).

Flow chart 700 also includes step 704 of comparing the control loop voltage (e.g., the error voltage) and a periodic n signal using a second comparator. In the example of power converter 200, the second comparator could be second comparator 211 and the periodic n signal could be a periodic ramp signal generated by periodic signal generator 210.

Flow chart 700 also includes steps 705 and 706 of generating a pulse width modulated signal $V_{PWM}$ with the second comparator and switching a power transistor using the pulse width modulated signal. In the example of power converter 200, the power transistor could be power transistor 212 and the PWM signal could switch the power transistor via driver 206.

In step 604, the power converter transitions from the first operating mode to a low power operating mode. This transition can include an alteration to the behavior of the power converter's control circuitry to put the power converter in a more power efficient state. For example, a periodic signal generator used in a control loop of the power converter could be disabled in the low power operating mode. As a more particular example, the low power operating mode could be a DCM variable switching frequency mode in accordance with that illustrated above in FIG. 5. As seen, the low power mode could involve the generation of a control signal that disables the periodic signal generator used as the basis for the switching frequency of a switched mode power converter. The periodic signal generator could be disabled for a portion of each switching cycle as by the $V_{RDIS}$ signal in FIG. 5. Alternatively, the periodic signal generator could be disabled for the entire low power operating mode, such as a low power operating mode in which the characteristic of the power converter changed from a switched mode converter to a linear converter.

In step 605, the mode control circuit could generate a comparison signal to be used to determine when the power converter should transition back to the first operating mode. For example, step 605 could include generating a comparison voltage based on an operating point of the power converter. In a particular example, this step could involve comparison voltage generation circuit 214 generating a comparison voltage based on an operating point of the power converter determined by measurement $M_X$. In another example, this step could involve generating an estimate of what the error voltage of the power converter would be if the power converter was operating in the first operating mode.

In step 606, the mode control circuit could compare a signal indicative of the operating point of the power converter with the comparison signal. For example, step 606 could include comparing a control loop voltage in the control loop with a comparison voltage using a first comparator. Generally, the comparison voltage could be set to a value equal to what the control loop voltage would be if the power converter had not transitioned to the low power mode. The comparison voltage could have a first value when the power converter is in the low power operating mode where the first value is an estimate of what the control loop voltage would be if the power converter were still operating in the first operating mode and was faced with the present operating point of the power converter. As such, the comparison signal generated in step 605 could vary with the operating point of the power converter in order to provide the appropriate switching point for returning to the first operating mode.

With reference to power converter 200, step 606 could involve taking the comparison voltage from comparison voltage generation circuit 214 and providing it to one of the inputs of comparator 207 to be compared against the compensator voltage $V_Y$. In these approaches, the comparison voltage would have a value equal to an estimate of what the comparison voltage would be if the power converter were in the first operating mode. With reference to power converter 300, the compensator voltage used for step 606 could be the error voltage $V_{EV}$. Comparator 207 could include hysteresis to assure that the stability of the control loop is preserved. The execution of step 606 could be conducted with this hysteresis applied to the comparison. In a particular approach, the hysteresis will favor remaining in a first operating mode as opposed to transitioning into a low power mode. For example, the hysteresis could favor remaining in a fixed switching frequency mode instead of transitioning into a variable switching frequency mode.

As seen in a comparison of FIGS. 4 and 5, the error voltage is lower in DCM as compared to CCM. As a result, in the particular case of power converter 300 operating in either DCM or CCM, and a comparison involving the error voltage, the comparison voltage will be higher than the error voltage when the power converter is in the low power operating mode. As such, the comparison voltage is fed to the positive terminal of the comparator, and the comparator monitors from when $V_{EV}$ returns to a value greater than the comparison voltage. However, in other applications, the terminals of the comparator can be switched based on the relative polarity of the comparison signal and the signal indicative of the operating point of the power converter in each of the operating modes the device can operate in.

In step 607, the mode control circuit generates a control signal with the comparator used in step 606. The control signal could indicate that the power converter should be transitioned back to the first operating mode from the low power operating mode. Returning to the example of power converter 300 and a comparison involving the error voltage, the comparator could be outputting a logical high signal while the error voltage remained lower than the comparison voltage, and then transition to outputting a logical low signal when the error voltage exceeded the comparison voltage. The logical low signal would therefore be a control signal generated by the first comparator that could be used to transition the power converter back to the first operating mode.

In step 608, the power converter could transition back to the first operating mode from the low power operating mode using the control signal generated in step 607. To use the example of power converter 300, this transition could involve mode control circuit 205 reconfiguring to enable the power converter to return to the first operating mode (e.g., transitioning from variable switching frequency mode back to fixed switching frequency mode). This transition could also involve enabling the periodic signal generator in the control circuit, or any other circuitry that was disabled in the low power mode.

Figure 8:
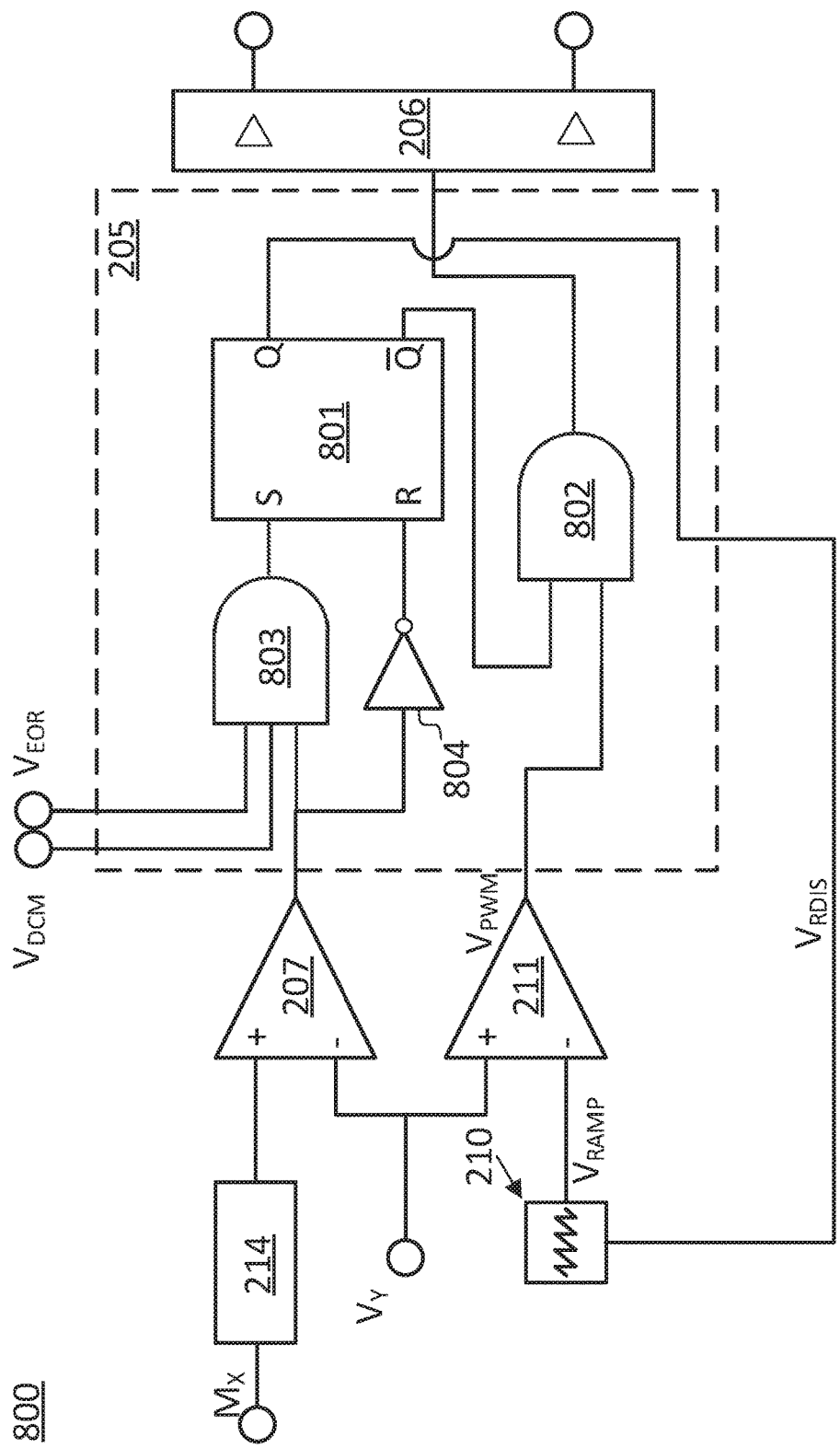
FIG. 8 illustrates a block diagram of a mode control and selection circuit that can be used in the power converter of FIG. 2 in accordance with embodiments of the present invention.

A mode control circuit can be described with reference to FIG. 8. The mode control circuit disables the periodic signal generator in the low power operating mode and is also instrumental in returning the power converter to the first operating mode in the execution of step 608 in FIG. 6. FIG. 8 illustrates a portion of a power converter control loop 800 that can be used in accordance with power converter 200 in FIG. 2. Like numerals are utilized for like parts in the two figures. The circuit includes a latch 801, a first AND gate 802, a second AND gate 803, and an inverter 804. The circuit receives the first control signal generated by comparator 207, a DCM signal via DCM voltage $V_{DCM}$, and an end of ramp signal via end of ramp voltage $V_{EOR}$. These signals are generated by additional control circuitry and sensing circuitry on the periodic signal generator and the output side of the power converter. In particular, the DCM signal could be generated when alternative circuitry detects that the current through the synchronous rectifying FET is approaching zero during a portion of the switching period.

If the example of power converter 300 were utilized in accordance with the approach in FIG. 8, the first control signal delivered to mode control circuit 205 could be high when the power converter was operating in a low power state and be low when the power converter was operating in the first operating mode. When the power converter is operating in the first operating mode $V_{EV}$ will be greater than the comparison voltage generated by comparison voltage generator 214. As such, the output of comparator 207 will be a logic low voltage, the S input to latch 801 will be logic low, the R input will be logic high, and the latch will be put into the reset state. As a result, the inverse output of latch 801 will provide a logic high to AND gate 802, and the PWM signal on $V_{PWM}$ will be passed through to driver 206.

Keeping with the same example, if the power converter transitions into a different operating point that is more amenable to a low power operating mode such as DCM, $V_{EV}$ will be less than the comparison voltage. In addition, the DCM signal will be high and the end of ramp signal $V_{EOR}$ will pulse high every time the ramp produced by periodic ramp generator 210 ends. The $V_{EOR}$ signal is used to ensure that $V_{RAMP}$ is not disabled and then enabled before a normal switching cycle time has occurred. Therefore, the mode control circuit will serve to disable the periodic signal when in the low power mode. At the same time, the inverse output of latch 801 will blank the PWM signal. In the illustrated case, this blanking is done by providing a zero to AND gate 802 thereby keeping the output of the AND gate 802 at zero regardless of the value of $V_{PWM}$. The corresponding control waveforms for this circuit align with those of the more general case of FIG. 5.

Figure 9:
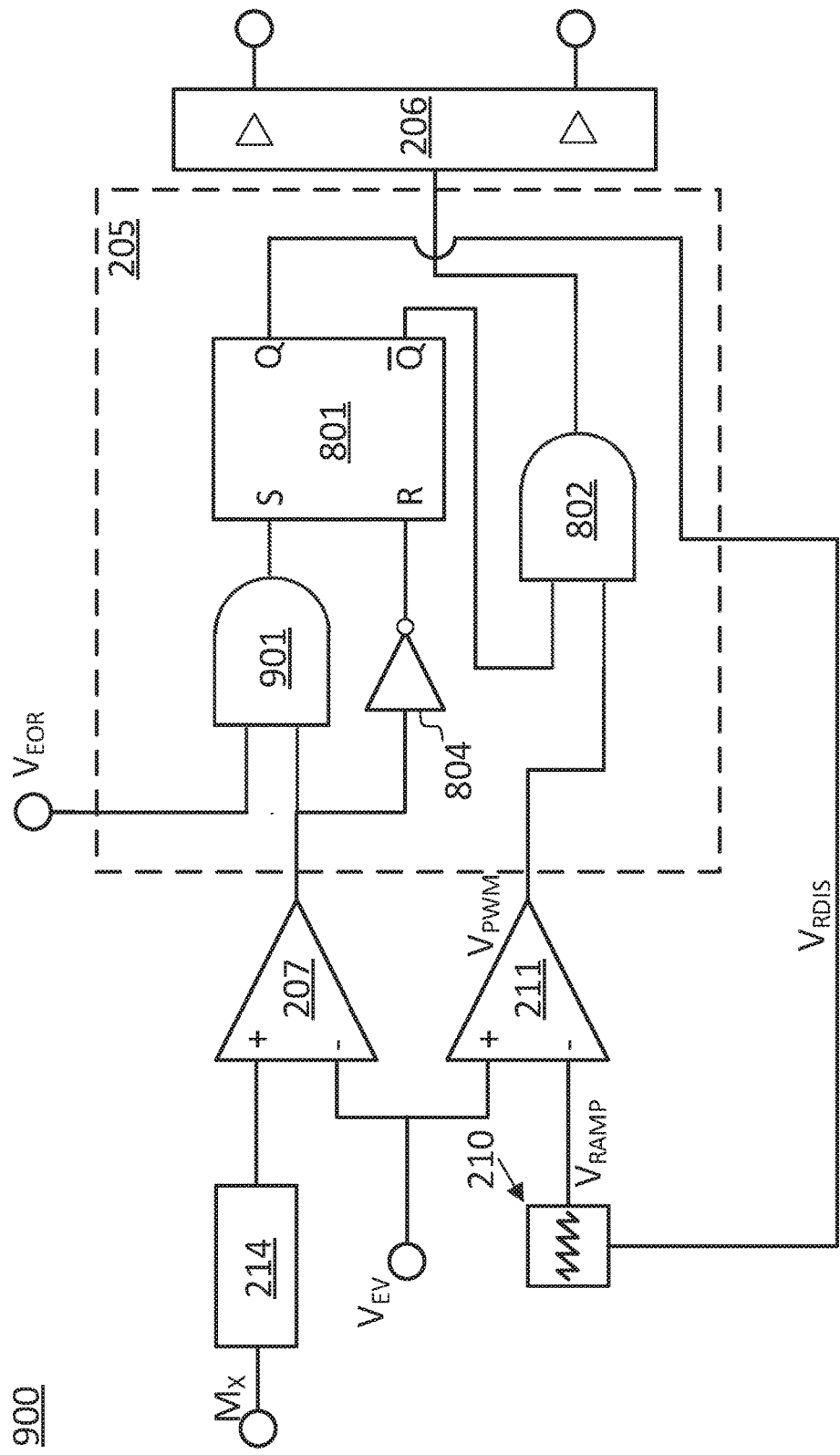
FIG. 9 illustrates a block diagram of another mode control and selection circuit that can be used in the power converter of FIG. 2 in accordance with embodiments of the present invention.
Figure 10:
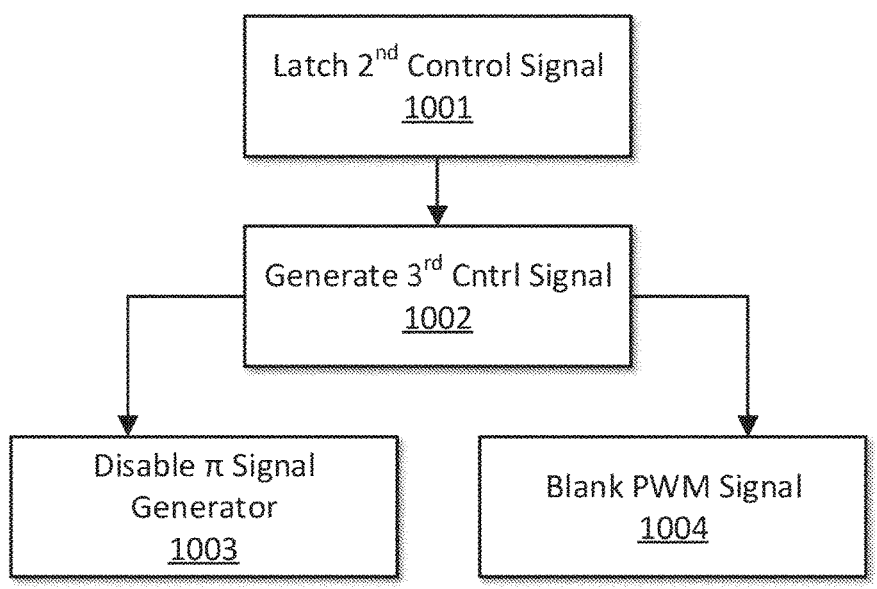
FIG. 10 illustrates a flow chart of a set of methods for operating the circuit of FIG. 8.

FIG. 9 illustrates an alternative approach via a portion of a power converter control loop 900. Portion 900 is similar to portion 800 with the exception of not utilizing the DCM control signal as an input to mode control circuit 205. A similar approach could be realized using portion 800 and keeping the DCM signal permanently high. In this approach, an analysis of the measurement signal Mx in comparison to the compensator voltage $V_Y$ is the main determining factor in switching between the first and low power operating modes. This approach enhances the flexibility of the mode control circuit. By adjusting the behavior of comparison voltage generator 214, the point at which the power converter is switched between the two modes can be independently control with respect to any actual transition between DCM and CCM operating modes. This approach could be used to implement an embodiment discussed previously in which the power converter switches to a variable switching frequency mode just prior to switching into DCM from CCM.

The operation of mode control circuit 800 in controlling the power converter in the low power mode can be described in more detail with reference to flow chart 1000. As mentioned, mode control circuit 800 can both disable the periodic n signal generator 1003 and blank the pulse width modulated signal 1004 while the power converter is in the low power operating mode. These steps can be conducted in response to the generation of a third control signal by a latch based on the latching of a second control signal. These steps are shown by steps 1001 and 1002 in flow chart 1000. These steps can both be executed by latch 801. The second control signal latched in step 1001 can be based on the first control signal, a DCM signal, and end of ramp signal produced by first AND gate 803. The first control signal can be the signal generated by the control loop circuitry that is monitoring a control loop voltage for when a transition between operating modes should occur. The third control signal can be the product of latching the second control signal. Note that a similar signal could be provided in situations in which the periodic signal is not a ramp signal. As shown, one or both of the steps of disabling the periodic signal generator and blanking the PWM signal can be executed in response to the third control signal generated in step 1002.

In the specific example of power converter 200 operating in a DCM mode, the methods of flow chart 1000 can be executed in accordance with the waveforms provided in FIG. 5. In this situation, the mode control circuit produces $V_{RDIS}$ to execute step 1003 and the execution of 1004 is apparent by $V_{PWM}$ remaining low despite the fact that $V_{RAMP}$ is less than $V_{EV}$ at the beginning of each switching cycle. Again, in these approaches and others like it, mode control circuit 800 is selecting the mode of the power converter by producing control signals to run the power converter in a specific mode as compared to another in which $V_{PWM}$ is just passed through the selection circuit for the CCM mode.

As illustrated by mode control circuit 800, the mode control circuit of the power converter can be instrumental in regulating the output of the power converter in any control mode. However, the mode control circuit is generally used to determine when a mode of operation should be exited based on the operating point of the converter. For example, based on the comparison signal provided to the control circuit, the mode control circuit could be configured to revert the power converter from a low power operating mode to a first operating mode if a specific operating point for the power converter is detected. With reference to mode control circuit 800, the comparison signal generated by comparison generator 214 could be a voltage that is greater than $V_{EV}$ when the power converter should be operating in low power mode and is less than $V_{EV}$ when the power converter should be operating in the first operating mode. As illustrated, if the comparison voltage were to suddenly become less than $V_{EV}$, indicating that the power converter should switch out of the low power operating mode back to a regular operating mode, the output of AND gate 803 would suddenly no longer depend on $V_{DE}$ or $V_{EOR}$. The R input to the latch would transition from zero to one and the S input to the latch would be a logic low. As a result, the periodic signal generator would not be disabled, and the $V_{PWM}$ would be passes directly through NAND gate 802. By this process, the mode control circuit 800 transitions the control loop from DCM to CCM.

The generation of a comparison value for delivery to the mode control circuit can be described with reference to FIGS. 11 and 12. In general, a comparison value will be produced based on an operating point of the power converter that is relevant to which operating mode the device should be in. This comparison value could be a voltage such as the voltage provided to comparator 207 in FIG. 8 by comparison voltage generator 214. The comparison value could be generated by a comparison generator based off a measurement of the operating point of the power converter and/or a design set point, an example of which is represented by $M_x$ in power converter 200. The comparison value could be the value that a specific voltage or current in the control loop would exhibit if the device was operating in a different operating mode. By monitoring when an operating point of the power converter causes a control voltage to reach such a level, the mode control circuit can orchestrate a smooth transition into another operating mode.

The comparison value can be generated based on various potential measurements of the operating point of the converter and/or a design set point. In certain approaches, it is beneficial to generate the comparison voltage based on a measurement obtained from the input side of the power converter because it will enable the mode control circuit to receive a comparison value without having to wait for a signal to travel back through a feedback path of the converter. For the same reason it can be beneficial to generate the comparison value without using a measurement from the output side of the power converter. In certain approaches, it is beneficial to utilize a measurement of the input voltage $V_{IN}$ as the measurement on which the comparison value is based.

An approach in which a measurement of the input voltage is utilized to generate a comparison value for the mode control circuit of a power converter is illustrated in FIG. 11. FIG. 11 includes a basic flow chart which includes a step 1101 of sensing the input of the power converter to obtain an input voltage measurement and a step 1102 of generating a comparison voltage component signal based on the input voltage measurement obtained in step 1101. As illustrated, the comparison voltage generator 1103 is coupled to the input node $V_{IN}$ in which power converter 1100 senses the input voltage in step 1101 and generates a comparison voltage in step 1102. Comparison voltage generator 1103 can include a sensing circuit to obtain a measurement of $V_{IN}$ from the input node. The sensing circuit could include a high impedance sensing circuit such that little current was drawn from the input while still obtaining a measurement of the voltage. In the illustrated case, the operating point of power converter 1100 is fully defined by the input voltage $V_{IN}$ and a set of other factors. However, step 1102 is conducted solely using the input voltage measurement and does not use the set of other factors in whole or in part. As such, the comparison voltage provided to comparator 207 by comparison voltage generator 1103 only needs to take a single measurement of the operating point of the power converter and does not need any other inputs other than the output voltage set point.

In certain approaches, power converters can utilize the same comparison voltage generation scheme as that illustrated by FIG. 11 and still produce a comparison voltage in the low power operating mode that is an estimate of what the error voltage would have been if the comparator was still operating in the first operating mode. In some power converters, the periodic signal of periodic signal generator 210 is produced by charging a capacitor with a current that is proportional to the input voltage $V_{IN}$ and discharging the capacitor. In some embodiments, the ramp voltage can be obtained by charging a capacitor with a current that is proportional to the input voltage $V_{IN}$ and discharging the capacitor at the end of the cycle. This approach can be referred to as input voltage feed-forward and it reduces disturbances on $V_{IN}$ from affecting the regulation of $V_{OUT}$. It can also keep the controller gain from changing with $V_{IN}$. The slope of $V_{RAMP}$ is increased by an increase in $V_{IN}$ and the effective amplitude $V_R$ is likewise increased for a fixed switching period. Assuming the slope of $V_{RAMP}$ is $M_{RAMP}$, the amplitude $V_R$ is $V_R = M_{RAMP} \times T$, where T is the fixed frequency switching period.

The waveforms illustrated in FIG. 4 can be used to describe how a measurement of $V_{IN}$, without any other measurements of the comparator's operating point, can be used to provide a comparison voltage that is in an estimate of what the error voltage would be if the power converter were operating in CCM. This comparison voltage can be used when the device has left CCM and is operating in DCM to set when the device should switch back to CCM (i.e., when the error voltage returns to exceed the synthesized comparison voltage, the device should return to CCM from DCM). The resulting voltage, which will be utilized as the comparison voltage while the comparator is in DCM, can be referred to as $V_{EBD}$ for this analysis.

In FIG. 4, the voltage of $V_{EV}$ at the beginning of the cycle is $V_{EB}$ and the voltage of $V_{RAMP}$ at the beginning of the cycle is $V_{RB}$. The voltage $V_{RB}$ is known based on the circuit design. Since the inductor current $i_L$ is piecewise linear, if the capacitor of the comparator's output filter were ideal the charge into and out of the output filter would be balanced during DT, the voltage $V_{EV}$ when PWM goes low would equal $V_{EB}$, and $V_{EAV}/V_R$ would equal the steady-state duty cycle D. The duty cycle D is also equal to $V_{OUT}/V_{IN}$. With a functioning regulator, the $V_{OUT}$ of the regulator is set to a given voltage $V_{SET}$ that is based only on the reference voltage applied to the system $V_{REF}$ and the known characteristics of the feedback loop (e.g. the value of the resistors in voltage divider 208). Therefore, since $V_R$ is either a set value, or is known from the input voltage in the case of a feed-forward design, the voltage $V_{EAV}$ can be derived for a near ideal comparator with $V_{IN}$ being the only measurement that needs to be taken regarding the operating point of the comparator. In the case of a buck converter with input voltage feed-forward, the $V_{EAV}$ voltage is a simple constant that is determined by the $V_{SET}$ voltage if the ripple component of the $V_{EV}$ signal is neglected. This constant can be calculated by assuming a nominal input voltage $V_{INNOM}$, and a nominal $V_{RAMP}$ slope $M_{RAMPNOM}$ resulting in a nominal ramp amplitude $V_{RNOM}$. Then $V_{EAV}/V_{RNOM} = V_{SET}/V_{INNOM}$. This simple constant may be good enough to implement the mode control. However, the ripple component of the regulator and time delays can also be taken into account in order to provide a more accurate comparison voltage and thereby more efficient transitions between operating modes.

The comparator 211 time delay $t_{DELC}$ causes an effective offset voltage $V_{OFFDELC} = t_{DELC} \times M_{RAMP}$ that should be subtracted from $V_{EAV}$. Since $M_{RAMP}$ increases with $V_{IN}$, this offset is proportional to $V_{IN}$. If inductor current signal $i_L$ is used in the feedback loop, the inductor current ripple produces a voltage offset term that affects $V_{EAV}$. Half of the peak-to-peak $V_{EV}$ voltage ripple due to the inductor current ripple should be added to $V_{EAV}$. This offset term can be calculated as $V_{OFFRIP} = (0.5 \times V_{SET} \times T \times R_{IG}/L) \times (1-(V_{SET}/V_{IN}))$, where $R_{IG}$ is the effective inductor current sense resistor and L is the inductance of inductor 104. An additional offset term due to the inductor current ripple and the total delays $t_{DELTOT}$ of the comparator 211, driver circuit 206, and switching circuit 202 is $V_{OFFDELTOT} = t_{DELTOT} \times V_{SET} \times R_{IG}/L$. This offset term should be subtracted from $V_{EAV}$. The adjusted $V_{EAV}$ voltage is $V_{EAVADJ} = V_{EAV} + V_{OFFRIP} - V_{OFFDELC} - V_{OFFDELTOT}$. As illustrated by this derivation, even with the ripple current taken into account, the only measurement of the operating point of the power converter that needs to be analyzed is the input voltage. However, generating the comparison voltage in accordance with the above derivation will require a comparison voltage component signal that is based on the input voltage, with terms proportional and inversely proportional to the input voltage (i.e., $V_{SET}/V_{IN}$). As a result, the comparison voltage generator must generate a comparison voltage component signal with an inverse relationship to the obtained measurement. The comparison voltage generator 1103 can conduct this operation using a divider circuit or circuitry that approximates division by generating some of the terms of a Taylor series for division to provide an estimate of the required comparison voltage component signal. The comparison voltage generator circuit could include digital or analog circuitry such as passive components and one or more operational amplifiers to provide the divider or some of the terms of a Taylor series for division.

While the specification has been described in detail with respect to specific embodiments of the invention, it will be appreciated that those skilled in the art, upon attaining an understanding of the foregoing, may readily conceive of alterations to, variations of, and equivalents to these embodiments. Although examples in the disclosure where directed to switching power converters that provided a fixed voltage to a regulated regime, the same approaches can be applied to power converters that provide a fixed current to a regulated regime. Although transitions between a low power and a higher power operating mode were used as examples, the teachings herein are more broadly applicable to transitions between operating modes generally. In the provided examples, the polarity of reference, ground, and signal carrying voltages can be switched in whole or in part to achieve similar results. For example, a logic low and logic high could be switched provided an additional inverter was added to the system or provided the entire system switched. Terms that relate to the behavior or characteristic of a power converter being "set by design," and other similar terms, are meant to refer to aspects of the design being determined ex ante by a designer before the part is produced. These terms are meant to distinguish characteristics of the power converter that change while the device is in operation such that they must be treated like variables instead of known values when the device is in operation. Furthermore, although examples in the disclosure were directed towards switching converters the approaches disclosed herein apply to any power converter scheme that transitions between operating modes and includes a control loop. These and other modifications and variations to the present invention may be practiced by those skilled in the art, without departing from the scope of the present invention, which is more particularly set forth in the appended claims.

What is claimed is:

1. A method to control a power converter, comprising:
   in a first operating mode of the power converter, generating a periodic signal with a periodic signal generator in a control loop of the power converter;
   converting the periodic signal into a drive signal that controls switching of a power switching circuit of the power converter to control transfer of power from an input node of the power converter to an output node of the power converter;
   transitioning the power converter from the first operating mode to a low power operating mode, wherein the transitioning from the first operating mode to the low power operating mode comprises disabling the periodic signal generator and, during the low power operating mode, the periodic signal generator is disabled during portions of respective switching periods of the power switching circuit based on measurements of current between the power switching circuit and the output node of the power converter;
   generating a comparison voltage based on an operating point of the power converter;
   with a first comparator of the power converter, comparing a control loop voltage in the control loop with the comparison voltage to generate a control signal;
   transitioning the power converter from the low power operating mode back to the first operating mode based on the control signal, wherein the periodic signal generator is enabled in the first operating mode;

regulating an output of the power converter in the low power operating mode and the first operating mode;
receiving an input on the input node of the power converter;
comparing a feedback voltage with a reference voltage using an amplifier; and
generating the control loop voltage with the amplifier, wherein the control loop voltage is an error voltage of the power converter;
wherein the comparison voltage has a first value when the power converter is in the low power operating mode; and
wherein the first value is an estimate of what the error voltage would be if the power converter were in the first operating mode.

2. The method of claim 1,
wherein the regulating is conducted using a power transistor of the power switching circuit;
wherein the power transistor is coupled to the input node;
wherein the feedback voltage is based on the output of the power converter; and
wherein the power transistor is controlled at least in part by the control loop.

3. The method of claim 2, further comprising:
in the first operating mode, comparing the error voltage and the periodic signal with a second comparator to generate a pulse width modulated signal; and
in the first operating mode, switching the power transistor with the pulse width modulated signal;
wherein the periodic signal is a periodic ramp signal.

4. The method of claim 3, further comprising:
disabling, while in the low power operating mode and using the control signal, the periodic signal generator;
wherein the low power operating mode is a variable switching frequency mode; and
wherein the first operating mode is a fixed switching frequency mode.

5. The method of claim 4, further comprising:
latching a second control signal with a latch, wherein the second control signal is based on the control signal and a DCM signal; and
generating a third control signal with the latch based on the latching of the second control signal;
wherein the disabling of the periodic signal generator is conducted in response to the third control signal.

6. The method of claim 3, further comprising:
blanking, while in the low power operating mode and using the control signal, the pulse width modulated signal;
wherein the low power operating mode is a variable switching frequency mode; and
wherein the first operating mode is a fixed switching frequency mode.

7. The method of claim 6, further comprising:
latching a second control signal with a latch, wherein the second control signal is based on the control signal and a DCM signal; and
generating a third control signal with the latch based on the latching of the second control signal;
wherein the blanking of the pulse width modulated signal is conducted in response to the third control signal.

8. The method of claim 1, further comprising:
regulating the output of the power converter using a power transistor, wherein the power transistor is coupled to the input node;
wherein the power transistor couples an output side of the power converter to an input side of the power converter;
wherein generating the comparison voltage based on the operating point of the power converter uses a measurement from the input side of the power converter; and
wherein generating the comparison voltage based on the operating point of the power converter does not use a measurement from the output side of the power converter.

9. The method of claim 1, further comprising:
regulating the output of the power converter using a power transistor of the power switching circuit, wherein the power transistor is coupled to the input node; and
sensing, while in the low power operating mode, the input to obtain an input voltage measurement;
wherein the operating point of the power converter is fully defined by the input and a set of other factors;
wherein generating the comparison voltage based on the operating point of the power converter uses the input voltage measurement; and
wherein generating the comparison voltage based on the operating point of the power converter does not use the set of other factors in whole or in part.

10. A power converter comprising:
a control loop that regulates an output of the power converter;
a periodic signal generator in the control loop that is operable to generate a periodic signal that is converted into a drive signal that controls switching of a power switching circuit of the power converter to control transfer of power from an input node of the power converter to an output node of the power converter, wherein in a first operating mode of the power converter the periodic signal generator is enabled to generate the periodic signal, and in a low power operating mode of the power converter the periodic signal generator is disabled from generating the periodic signal during portions of respective switching periods of the power switching circuit based on measurements of current between the power switching circuit and the output node of the power converter;
a comparison voltage generation circuit that generates a comparison voltage based on an operating point of the power converter;
a first comparator that compares a control loop voltage in the control loop with the comparison voltage to generate a control signal, wherein the control loop voltage is an error voltage of the power converter; and
a mode control circuit that transitions the power converter from the low power operating mode to the first operating mode based on the control signal;
wherein the output is regulated in both the first operating mode and the low power operating mode;
wherein the comparison voltage has a first value when the power converter is in the low power operating mode; and
wherein the first value is an estimate of what the error voltage would be if the power converter were in the first operating mode.

11. The power converter of claim 10, further comprising:
an amplifier that compares a feedback voltage with a reference voltage to generate the control loop voltage; and a power transistor that: (i) is coupled to the input node; and (ii) is used by the control loop to regulate the output of the power converter;
wherein the feedback voltage is based on the output of the power converter.

12. The power converter of claim 11, further comprising:
a second comparator that compares the error voltage and the periodic signal generated by the periodic signal generator to generate a pulse width modulated signal in the first operating mode; and
a driver circuit that switches the power transistor using the pulse width modulated signal;
wherein the periodic signal is a periodic ramp signal.

13. The power converter of claim 12, wherein:
the mode control circuit disables the periodic signal generator while the power converter is in the low power operating mode;
the low power operating mode is a variable switching frequency mode; and
the first operating mode is a fixed switching frequency mode.

14. The power converter of claim 13, further comprising:
a latch in the mode control circuit that: (i) latches a second control signal; and (ii) generates a third control signal with the latch based on the latching of the second control signal;
wherein the second control signal is based on the control signal and a DCM signal; and
wherein the disabling of the periodic signal generator is conducted in response to the third control signal.

15. The power converter of claim 12, wherein:
the mode control circuit blanks the pulse width modulated signal while the power converter is in the low power operating mode;
the low power operating mode is a variable switching frequency mode; and
the first operating mode is a fixed switching frequency mode.

16. The power converter of claim 15, further comprising:
a latch in the mode control circuit that: (i) latches a second control signal; and (ii) generates a third control signal based on the latching of the second control signal;
wherein the second control signal is based on the control signal and a DCM signal; and
wherein the blanking of the pulse width modulated signal is conducted in response to the third control signal.

17. The power converter of claim 10, further comprising:
a power transistor of the power switching circuit that: (i) is coupled to the input node; and (ii) is used by the control loop to regulate an output voltage of the power converter;
wherein the power transistor couples an output side of the power converter to an input side of the power converter;
wherein the comparison voltage generation circuit uses a measurement from the input side of the power converter to generate the comparison voltage; and
wherein the comparison voltage generation circuit does not use a measurement from the output side of the power converter to generate the comparison voltage.

18. The power converter of claim 10, further comprising:
a power transistor of the power switching circuit that: (i) is coupled to the input node; and (ii) is used by the control loop to regulate an output voltage of the power converter;
a sensing circuit that senses an input voltage applied to the input node, while the power converter is in the low power operating mode, to obtain an input voltage measurement;
wherein the operating point of the power converter is fully defined by the input voltage and a set of other factors;
wherein the comparison voltage generation circuit uses the input voltage measurement to generate the comparison voltage; and
wherein the comparison voltage generation circuit does not receive any other signal based on a measurement of the set of other factors in whole or in part.

19. A power converter comprising:
an input node that receives an input voltage of the power converter;
a control loop that regulates an output voltage of the power converter;
a power transistor of a power switching circuit that: (i) is coupled to the input node; and (ii) is used by the control loop to regulate the output voltage of the power converter;
a periodic signal generator that is operable to generate a periodic signal that is converted into a drive signal that controls switching of the power transistor to control transfer of power from the input node of the power converter to an output node of the power converter;
a comparison voltage generation circuit that generates a comparison voltage based on an operating point of the power converter;
a first comparator that compares a control loop voltage in the control loop with the comparison voltage to generate a control signal; and
a mode control circuit that transitions the power converter from a low power operating mode of the power converter to a first operating mode of the power converter based on the control signal, wherein in the first operating mode of the power converter the periodic signal generator is enabled to generate the periodic signal, and in the low power operating mode of the power converter the periodic signal generator is disabled from generating the periodic signal for portions of respective switching periods of the power transistor based on measurements of current between the power switching circuit and the output node of the power converter;
wherein the output voltage is regulated in both the first operating mode and the low power operating mode;
wherein the power transistor couples an output side of the power converter to an input side of the power converter;
wherein the comparison voltage has a first value when the power converter is in the low power operating mode; and
wherein the first value is an estimate of what an error voltage would be if the power converter were in the first operating mode.

20. The power converter of claim 19, wherein the low power operating mode is a variable switching frequency mode, and the first operating mode is a fixed switching frequency mode.

21. The power converter of claim 19, further comprising:
an amplifier that compares a voltage with a reference voltage to generate the control loop voltage;
wherein the control loop voltage is the error voltage of the power converter; and
wherein a feedback voltage is based on the output voltage.

22. The power converter of claim 19, further comprising:
a second comparator that compares the error voltage and the periodic signal generated by the periodic signal generator to generate a pulse width modulated signal in the first operating mode; and
a driver circuit that switches the power transistor using the pulse width modulated signal;
wherein the periodic signal is a periodic ramp signal.

* * * * *